United States Patent
Millar et al.

(10) Patent No.: US 9,749,089 B2
(45) Date of Patent: Aug. 29, 2017

(54) FAST LOG-LIKELIHOOD RATIO (LLR) COMPUTATION FOR DECODING HIGH-ORDER AND HIGH-DIMENSIONAL MODULATION SCHEMES

(71) Applicant: Mitsubishi Electric Research Laboratories, Inc., Cambridge, MA (US)

(72) Inventors: David Millar, Winchester, MA (US); Toshiaki Koike-Akino, Saugus, MA (US); Keisuke Kojima, Weston, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 36 days.

(21) Appl. No.: 14/931,959

(22) Filed: Nov. 4, 2015

(65) Prior Publication Data
US 2017/0126360 A1    May 4, 2017

(51) Int. Cl.
*H03M 13/00* (2006.01)
*H04L 1/00* (2006.01)

(52) U.S. Cl.
CPC .......... *H04L 1/0045* (2013.01); *H04L 1/0057* (2013.01); *H04L 1/0061* (2013.01)

(58) Field of Classification Search
None
See application file for complete search history.

(56) References Cited

U.S. PATENT DOCUMENTS

| | | | | |
|---|---|---|---|---|
| 8,601,337 B2* | 12/2013 | Sugihara | .............. | H03M 13/112 714/752 |
| 8,793,560 B2 | 7/2014 | Sidi et al. | | |
| 8,799,742 B1* | 8/2014 | Zhang | ................ | H03M 13/1128 714/759 |
| 2008/0069262 A1* | 3/2008 | Prasad | ...................... | H04L 1/20 375/267 |
| 2015/0026541 A1* | 1/2015 | Zhang | ................ | H03M 13/1111 714/776 |
| 2015/0092879 A1* | 4/2015 | Mansour | ............. | H04L 25/4917 375/286 |
| 2016/0065315 A1* | 3/2016 | Koike-Akino | ..... | H04B 10/6165 398/44 |

* cited by examiner

*Primary Examiner* — Daniel McMahon
(74) *Attorney, Agent, or Firm* — Gene Vinokur; James McAleenan; Hironori Tsukamoto

(57) ABSTRACT

A method receives the symbol transmitted over a channel, selects, from a constellation of codewords, a first codeword neighboring the received symbol and a set of second codewords neighboring the first codeword, and determines a relative likelihood of each second codeword being the transmitted symbol with respect to a likelihood of the first codeword being the transmitted symbol. Next, the method determines an approximation of a log-likelihood ratio (LLR) of each data bit in the received symbol as a log of a ratio of a sum of the relative likelihoods of at least some of the second codewords having the same value of the data bit to a sum of the relative likelihoods of at least some of the second codewords having different value of the data bit and decodes the received symbol using the LLR of each data bit.

12 Claims, 10 Drawing Sheets

FAST LOG-LIKELIHOOD RATIO (LLR) COMPUTATION FOR DECODING HIGH-ORDER AND HIGH-DIMENSIONAL MODULATION SCHEMES

FIELD OF THE INVENTION

The present invention relates generally to digital communications, and more specifically to computing log-likelihood ratio (LLRs) for decoding modulated symbols.

BACKGROUND OF THE INVENTION

In a digital communication system, a transmitter typically encodes traffic data based on a forward-error correction (FEC) coding scheme to obtain code bits and further maps the code bits to modulation symbols based on a modulation scheme. The transmitter then processes the modulation symbols to generate a modulated signal and transmits this signal via a communication channel. The communication channel distorts the transmitted signal with a channel response and further degrades the signal with noise and interference.

A receiver receives the transmitted signal and processes the received signal to obtain symbols, which can be distorted and noisy versions of the modulation symbols sent by the transmitter. The receiver can then compute log-likelihood ratio (LLRs) for the code bits based on the received symbols. The LLRs are indicative of the confidence in zero ('0') or one ('1') being sent for each code bit. For a given code bit, a positive LLR value can indicate more confidence in '0' being sent for the code bit, a negative LLR value can indicate more confidence in '1' being sent for the code bit, and an LLR value of zero can indicate equal likelihood of '0' or '1' being sent for the code bit. With FEC decoder, the receiver can then decode the LLRs to obtain decoded data, which is an estimate of the traffic data sent by the transmitter.

In a soft-in soft-out (SISO) decoder, "soft" refers to the fact that the incoming and/or outgoing data can take on values other than 0 or 1, in order to indicate reliability. The soft output is the LLR for value of the bit, is used as the soft input to an outer decoder. The computation for the LLRs can be complex, leading to high power consumption. However, accurate LLRs can increase the decoding performance. There is therefore a need in the art for techniques to efficiently and accurately compute LLRs for code bits.

The computational difficulty for LLRs calculation is even more apparent for optical communication systems using block-coded high-dimensional modulation formats. For example, any digital modulation scheme uses a finite number of distinct symbols to represent digital data. For example, conventional dual-polarization binary phase-shift keying (DP-BPSK) transmits two bits on the four dimensions of the optical carrier. Two dimensions are modulated independently, and only two dimensions are utilized. However, the optical coherent communication systems are naturally suited for modulation with four-dimensional (4D) signal constellations.

Four-dimensional modulation formats can achieve substantial gains compared with conventional modulation formats such as dual-polarization quaternary phase-shift keying (DP-QPSK) and 16-ary quadrature-amplitude modulation (DP-16QAM). Polarization-switched QPSK (PS-QPSK) and set-partitioned 128-ary QAM (SP-128QAM) are known to be practical 4D constellations, and they can achieve 1.76 dB and 2.43 dB gains in asymptotic power efficiency, respectively. The achievable gain can be further improved by using higher dimensional modulation formats. For example, 24D extended Golay code achieves 6.00 dB gain by producing the block of 24 bits including 12 data bits and 12 parity bits selected to increase distance between possible symbols, which makes the LLRs calculation computationally complex.

Accordingly, there is a need to reduce computational complexity for determining LLRs for modulated symbols transmitted over a channel.

SUMMARY OF THE INVENTION

It is an object of some embodiments of an invention to provide a system and a method for decoding modulated symbols transmitted over a channel, such as a wireless channel or an optical channel. In some embodiments of the invention, a modulated symbol includes data bits and parity bits used for encoding the symbol.

Some embodiments of the invention provide a system and a method for determining LLRs for modulated symbols in a computationally efficient manner. For example, some embodiments trade off accuracy of the LLR calculation against computational complexity by considering a subset of the most likely nearest neighbor codewords for each bit of transmitted symbol.

Specifically, some embodiments are based on recognition that the LLRs of all codewords can be calculated to determine the most likely codeword. However, the LLR can also be approximated by using the relative likelihood of the codewords with respect to another codeword. In addition, some embodiments are based on a realization that by considering only nearest neighbor codewords an almost exact LLR can be approximated while significantly reducing the number of calculations. For example, in one embodiment of the invention for 24D extended Golay code, the number of calculations for determining the LLRs of modulated symbols is reduced from 4096 to 759 by considering the likelihoods of only nearest neighbors.

In some embodiments of the invention, the LLR approximation is based on belief propagation over factor graph for block-coded high-dimensional modulations, which can be expressed by a parity-check matrix. The output of LLR values from the belief propagation can be further refined by a nonlinear filter, including artificial neural networks and Volterra filter. In order to reduce the computational complexity of nonlinear filters, some minor edges over nonlinear filter are pruned. Stochastic back-propagation provides more accurate LLR approximation by reinforcement learning offline. In addition, one embodiment takes soft-decision feedback from the FEC decoder to refine LLRs as a bit-interleaved coded modulation with iterative demodulation. The offline learning is carried out for BICM-ID to provide more accurate LLR approximations over graph. Another embodiment of the invention uses nonbinary FEC coding. The method of the LLR approximation is generalized for any Galois field size, where multiple LLR values are treated as one LLR vector message.

In yet another embodiment, the method of the invention provides efficient high-dimensional modulation to maximize the mutual information of the approximated LLRs. The method projects N-dimensional hyper cubes onto M-dimensional subspace to achieve shaping gain for M-dimensional modulation formats. One embodiment uses an exponential mapping matrix for Grassmannian manifold.

Accordingly, one embodiment of the invention discloses a method for decoding a symbol transmitted over a channel, wherein the symbol is encoded and modulated to include data bits and parity bits, including receiving the symbol transmitted over a channel, wherein the received symbol includes the transmitted symbol modified with noise of the channel; selecting, from a constellation of codewords, a first codeword neighboring the received symbol and a set of second codewords neighboring the first codeword; determining a relative likelihood of each second codeword being the transmitted symbol with respect to a likelihood of the first codeword being the transmitted symbol; determining an approximation of a log-likelihood ratio (LLR) of each data bit in the received symbol as a log of a ratio of a sum of the relative likelihoods of at least some of the second codewords having the same value of the data bit to a sum of the relative likelihoods of at least some of the second codewords having different value of the data bit; and decoding the received symbol using the LLR of each data bit. The steps of method are performed using a processor of a decoder.

Another embodiment discloses a receiver decoding a symbol transmitted over a channel, wherein the symbol is encoded and modulated to include data bits and parity bits, including: a demodulator connected to an antenna to receive the symbol transmitted over a channel, wherein the received symbol includes the transmitted symbol modified with noise of the channel; a memory to store a constellation of codewords; and a decoder connected to a processor to select, from the constellation of codewords, a first codeword neighboring the received symbol and a set of second codewords neighboring the first codeword, to determine a relative likelihood of each second codeword being the transmitted symbol with respect to a likelihood of the first codeword being the transmitted symbol, to determine an approximation of a log-likelihood ratio (LLR) of each data bit in the received symbol as a log of a ratio of a sum of the relative likelihoods of at least some of the second codewords having the same value of the data bit to a sum of the relative likelihoods of at least some of the second codewords having different value of the data bit, and to decode the received symbol using the LLR of each data bit.

DETAILED DESCRIPTION OF THE PREFERRED EMBODIMENTS

Figure 1:
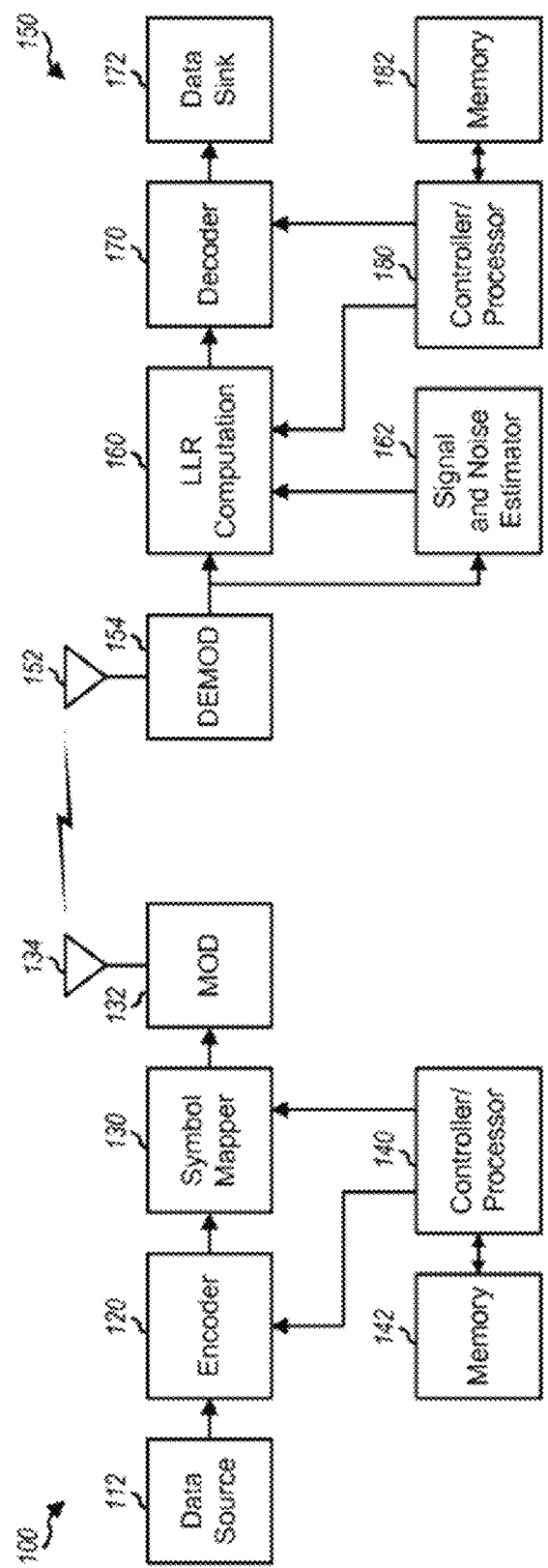
FIG. 1 is a block diagram of a design of a transmitter 100 and a receiver150 in a digital communication system employed by some embodiments of the invention.

FIG. 1 shows a block diagram of a design of a transmitter 100 and a receiver150 in a digital communication system. At transmitter 100, an encoder 120 receives a block of data from a data source 112, encodes the data block based on an FEC coding scheme, and provides code bits. A data block can also be referred to as a transport block, a packet, or a frame. An encoder 120 can perform rate matching and delete or repeat some or all of the code bits to obtain a desired number of code bits for the data block. The encoder 120 can also perform channel interleaving and reorder the code bits based on an interleaving scheme. A symbol mapper 130 maps the code bits to modulation symbols based on a modulation scheme, which may be QPSK, QAM, etc. A modulator (MOD) 132 can perform processing for code-division multiplexing (CDM), frequency-division multiplexing (FDM), orthogonal frequency-division multiplexing (OFDM), single-carrier FDM (SC-FDM), or single-carrier (SC). The modulator 132 then processes, e.g., converts to analog, amplifies, filters, and frequency up-converts, the resultant output symbols and generates modulated symbols, which are transmitted via an antenna 134 for wireless communication systems. For optical communication systems, electro-optical devices such as laser are used to transmit corresponding symbols over fiber.

At receiver 150, an antenna 152 receives the modulated signal from transmitter 100 and provides a received signal. A demodulator (DEMOD) 154 processes, e.g., filters, amplifies, frequency down-converts, and digitizes, the received signals to obtain discrete samples. Demodulator 154 can further process the samples (e.g., for CDM, FDM, OFDM, SC-FDM, etc.) to obtain received symbols.

A signal and noise estimator 162 can estimate signal and noise characteristics and/or the wireless/optical channel response based on the received symbols. An LLR computation unit 160 computes LLRs for code bits based on the received symbols and the signal, noise and/or channel estimates. A decoder 170 decodes the LLRs in a manner complementary to the encoding performed by transmitter 100 and provides decoded data. In general, the processing by demodulator 154, LLR computation unit 160, and decoder 170 at receiver 150 is complementary to the processing by modulator 132, symbol mapper 130, and encoder 120 at transmitter 100.

Controllers/processors 140 and 180 direct the operation of various processing units at transmitter 100 and receiver 150, respectively. The memories 142 and 182 store data, e.g., a constellation of codewords, and program codes for transmitter 100 and receiver 150. In general, encoder 120 can implement any FEC coding scheme, such as a turbo code, a convolutional code, a low-density parity-check (LDPC) code, a cyclic redundancy check (CRC) code, a block code, etc., or a combination thereof. The encoder 120 can generate and append a CRC value to a data block, which can be used by the receiver 150 to determine whether the data block decoded correctly or in error. Turbo code, convolutional code, and LDPC code are different FEC codes that allow the receiver 150 to correct errors caused by impairments in the wireless or optical channels.

Figure 2:
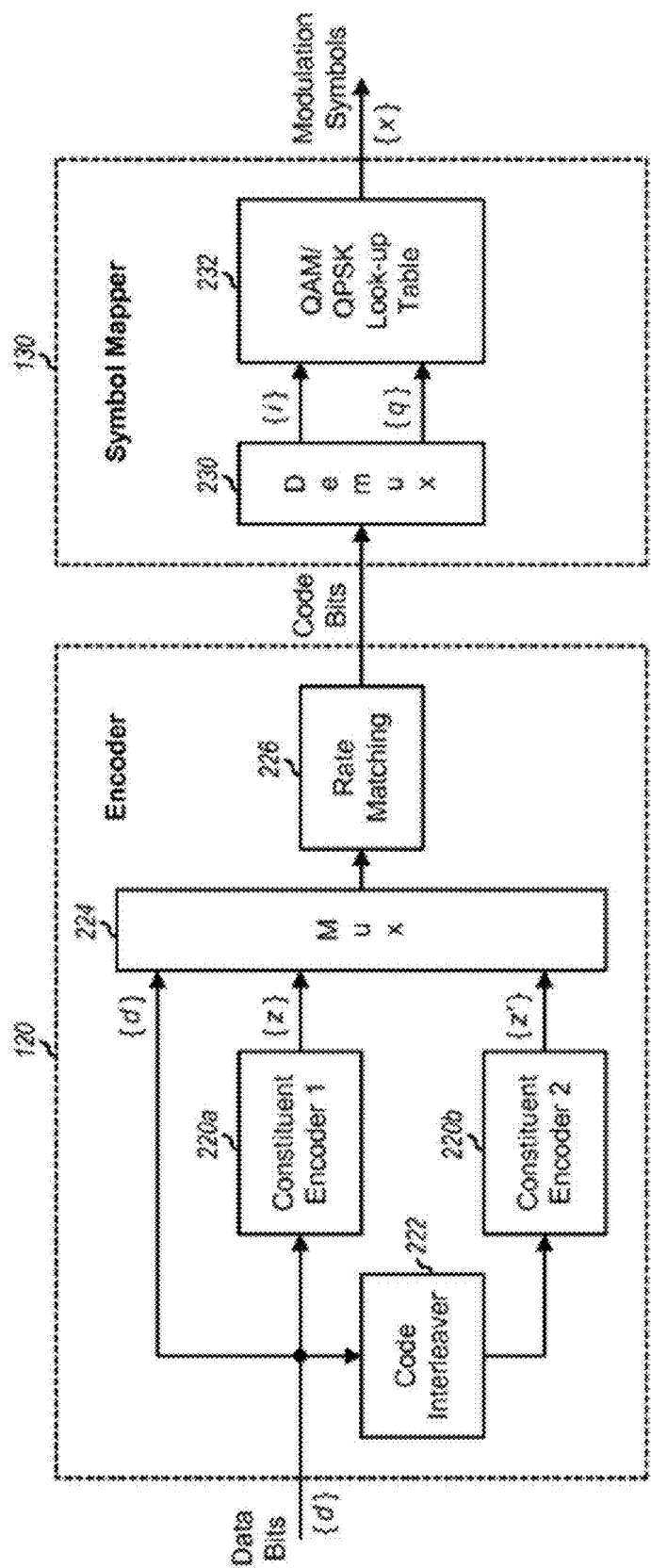
FIG. 2 is a block diagram of the encoder and the symbol mapper at the transmitter in FIG. 1 according to one embodiment of the invention.

FIG. 2 shows a block diagram of the encoder 120 and the symbol mapper 130 at the transmitter 100 in FIG. 1 according to one embodiment of the invention. In this embodiment, the encoder 120 implements a turbo code, which is also referred to as a parallel concatenated convolutional code. Within encoder 120, a code interleaver 222 receives a block of data bits (denoted as {d}) and interleaves the data bits in accordance with a code interleaving scheme. A first constituent encoder 220a encodes the data bits based on a first constituent code and provides first parity bits (denoted as {z}). A second constituent encoder 220b encodes the interleaved data bits from code interleaver 222 based on a second constituent code and provides second parity bits (denoted as {z'}). According to other embodiments, the encoder 120 may implement a low density parity check (LDPC) code, a staircase code, a BCH code, a polar code, or any other channel coding scheme.

For example, the constituent encoders 220a and 220b can implement two generator polynomials, e.g., $g_0(D)=1+D^2+D^3$ and $g_1(D)=1+D+D^3$ used in Wideband Code Division Multiple Access (W-CDMA), where D denotes a delay operator. A multiplexer (Mux) 224 receives the data bits and the parity bits from constituent encoders 220a and 220b, multiplexes the data and parity bits, and provides code bits. Multiplexer 224 may cycle through its three inputs and provide one bit at a time to its output, or $\{d_1, z_1, z'_1, d_2, z_2, z'_2, \ldots\}$. A rate matching unit 226 receives the code bits from multiplexer 224 and may delete some of the code bits and/or repeat some or all of the code bits to obtain a desired number of code bits for the data block. Although not shown in FIG. 2, encoder 120 may also perform channel interleaving on the code bits from rate matching unit 226.

In some embodiments, within symbol mapper 130, a demultiplexer (Demux) 230 receives the code bits from encoder 120 and demultiplexes the code bits into an in-phase (I) stream {i} and a quadrature (Q) stream {q}. Demultiplexer 230 can provide the first code bit to the I stream, then the next code bit to the Q stream, then the next code bit to the I stream, etc. A QAM/QPSK look-up table 232 receives the I and Q streams, forms sets of B bits, and maps each set of B bits to a modulation symbol based on a selected modulation scheme, where B=2 for QPSK, B=4 for 16-QAM, etc. Symbol mapper 130 provides modulation symbols {x} for the data block.

Figure 3:
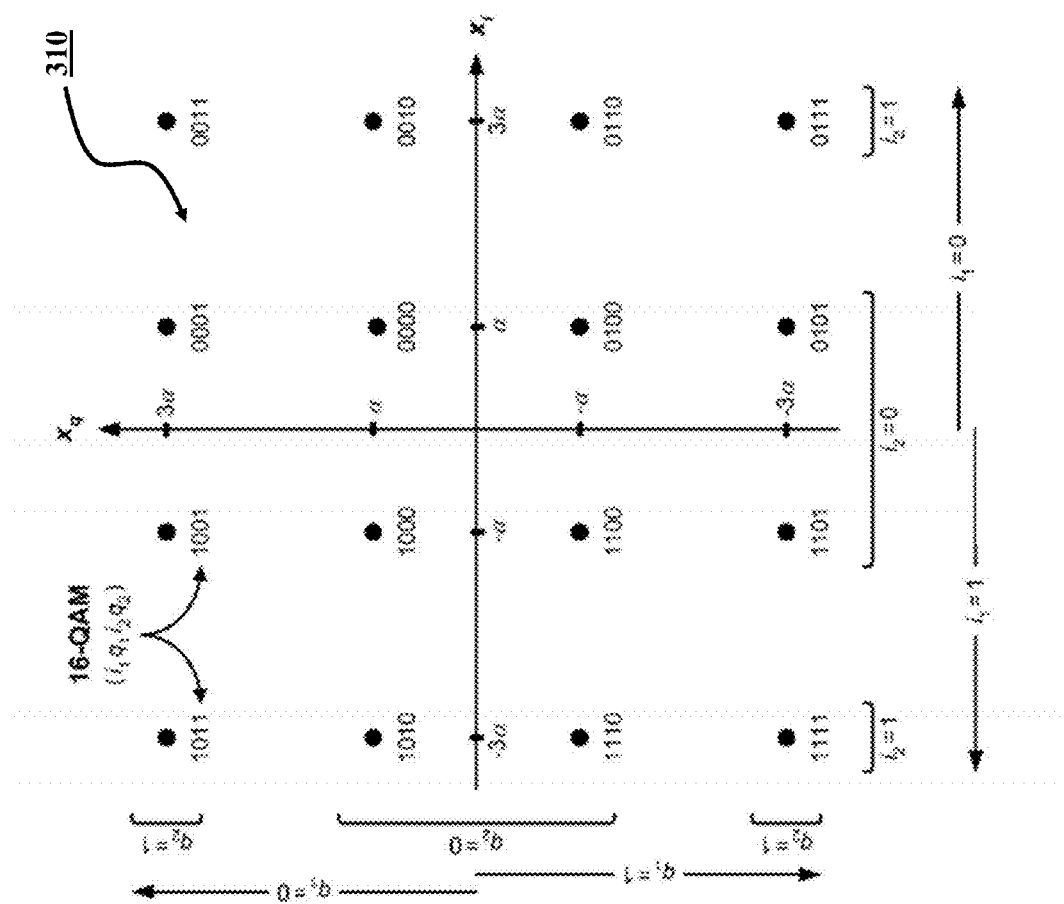
FIG. 3 is a schematic of an exemplar signal constellation used by one embodiment of the invention.

FIG. 3 shows an example signal constellation for 16-QAM, which is used by some embodiments of the invention. This signal constellation includes 16 signal points corresponding to 16 possible modulation symbols for 16-QAM. Each modulation symbol is a complex value of the form $x_i+jx_q$, where $x_i$ is the real component, $x_q$ is the imaginary component, and j denotes imaginary unit. The real component $x_i$ can have a value of $-3\alpha$, $-\alpha$, $\alpha$ or $3\alpha$, and the imaginary component $x_q$ can also have a value of $-3\alpha$, $-\alpha$, $\alpha$ or $3\alpha$, where a is typically 1/sqrt(10).

For 16-QAM, the code bits in the I and Q streams from demultiplexer 230 can be grouped into sets of four bits, with each set being denoted as $\{i_1\ q_1\ i_2\ q_2\}$, where bits $i_1$ and $i_2$ are from the I stream and bits $q_1$ and $q_2$ are from the Q stream. The 16 modulation symbols in the signal constellation are associated with 16 possible 4-bit values for $\{i_1\ q_1\ i_2\ q_2\}$. FIG. 3 shows an example mapping of each possible 4-bit value to a specific modulation symbol. In this mapping, the real component $x_i$ of a modulation symbol is determined by the two in-phase bits $i_1$ and $i_2$, and the imaginary component $x_q$ is determined by the two quadrature bits $q_1$ and $q_2$. In particular, bit $i_1$ determines the sign of the real component $x_i$, with $x_i>0$ for $i_1=0$, and $x_i<0$ for $i_1=1$. Bit $i_2$ determines the magnitude of the real component $x_i$, with $|x_i|=a$ for $i_2=0$, and $|x_i|=3a$ for $i_2=1$. Bit $i_1$ may thus be considered as a sign bit for $x_i$, and bit $i_2$ may be considered as a magnitude bit for $x_i$. Similarly, bit $q_1$ determines the sign of the imaginary component $x_q$, and bit $q_2$ determines the magnitude of the imaginary component $x_q$. The mapping is independent for the real and imaginary components. For each component, 2-bit values of '11', '10', '00' and '01' are mapped to $-3\alpha$, $-\alpha$, $\alpha$, and $3\alpha$, respectively, based on pulse amplitude modulation (PAM). Two 4-PAM modulation symbols may thus be generated separately based on $(i_1\ i_2)$ and $(q_1\ q_2)$ and then quadrature combined to obtain a 16-QAM modulation symbol.

Higher-order modulation formats such as 64-QAM and 256-QAM receive more bits to generate modulated symbols. Increasing the modulation order usually requires more complicated demodulation to produce LLRs for the decoder because the number of constellation points is of an exponential order with respect of the number of bits. In some embodiments, the modulator uses higher-dimensional modulation formats to improve resilience against channel noise. For such high-dimensional modulation, even more complex computation for demodulation is required. The method of the invention provides computationally efficient LLR calculations for low-power demodulation in particular for high-order and high-dimensional modulation formats.

LLR Calculation

Figure 4:
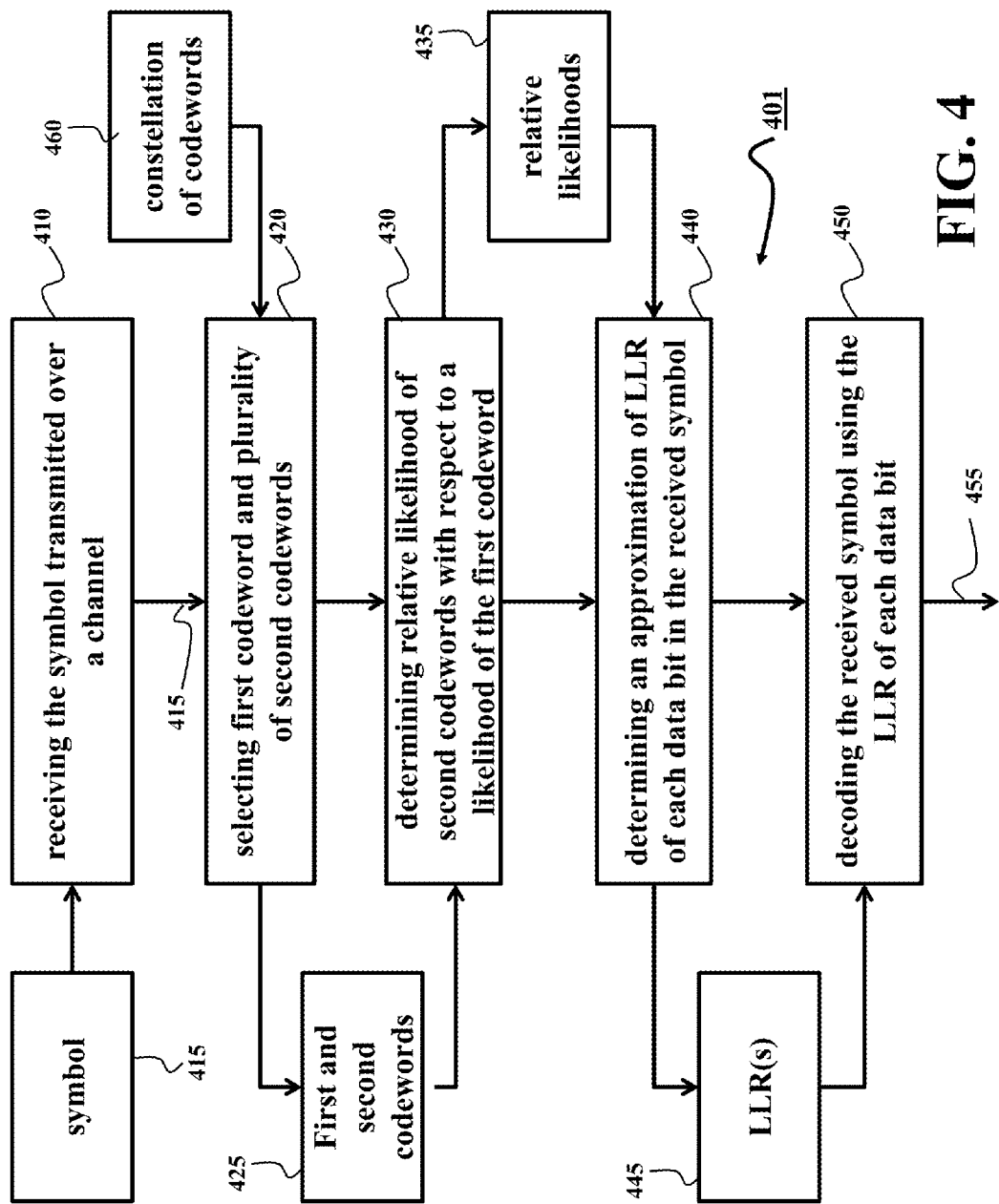
FIG. 4 is a block diagram of a method for decoding a symbol transmitted over a channel according to some embodiments of the invention.

FIG. 4 shows a block diagram of a method for decoding a symbol transmitted over a channel according to some embodiments of the invention. The symbol is encoded and modulated to include data bits and parity bits, and can be transmitted over a wireless, wired, or fiber-optic channel. The method decodes the transmitted symbol by determining an approximation of LLR of each data bit as a logarithm of a ratio of a sum of the relative likelihoods of at least some of the second codewords having the same value of the data bit to a sum of the relative likelihoods of at least some of the second codewords having different value of the data bit. Steps of the method can be using a processor 401 of a decoder.

The method receives 410 the symbol 415 transmitted over a channel. The received symbol includes the transmitted symbol modified with noise of the channel. For example, the received symbol includes data bits modified with noise with known received values and unknown transmitted values selected from a predetermined constellation of codewords 460. Examples of such constellations include the constellation 310 of FIG. 3. Next, the method selects, from a constellation of codewords 460, a first codeword neighboring the received symbol and a set of second codewords 425 neighboring the first codeword.

Figure 5:
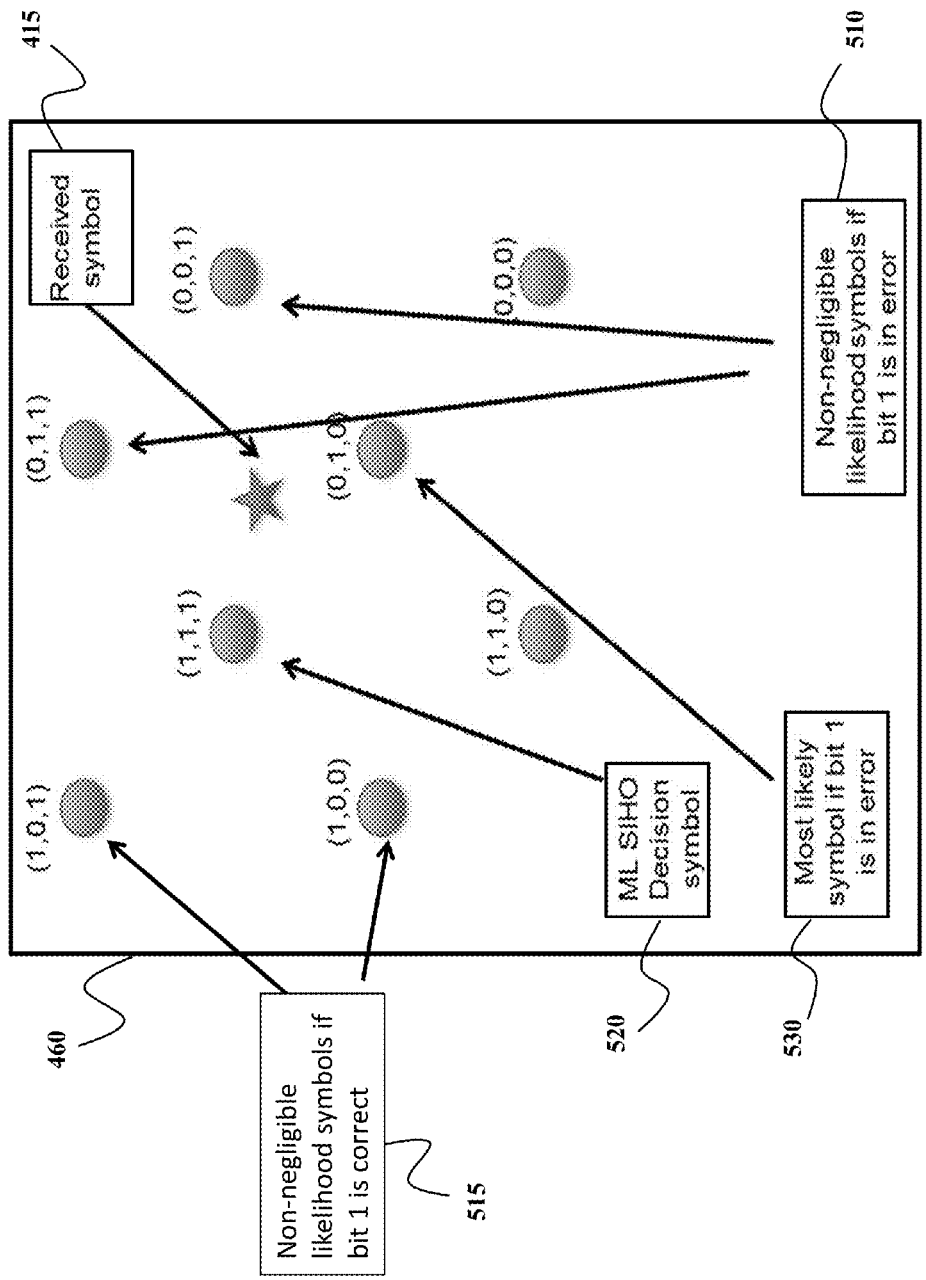
FIG. 5 is a schematic of the constellation of codewords including the received symbol mapped to the constellation according to some embodiments of the invention.

FIG. 5 shows a schematic of the constellation of codewords 460 including the received symbol 415 mapped to the constellation. Some embodiments of the invention determine the first codeword 520 as a codeword closest to the received symbol. For example, one embodiment determines the first codeword 520 using soft-in hard-out (SIHO) decoding of the symbol. An example of the SIHO decoding is minimum Euclidean distance decoding.

Some embodiments are based on recognition that the LLR can be approximated using relative likelihood of the most likely nearest neighbor symbol 530 and the first codeword 520. However, such approach suffers from an approximation error. To that end, some embodiments of the invention determine a plurality of the codewords having a distance to the first codeword less or equal a threshold to form the set of second codewords. In such a manner, the set of second codewords include not only the most likely nearest neighbor symbol 530, but also other symbols 510 with non-negligible likelihoods if the given bit is in error in the first codeword, and a plurality of symbols 515 other than the first codeword with non-negligible likelihood if the given bit is correct in the first codeword.

For example, some embodiments of the invention measure the distance to the first codeword as a Hamming distance or as a Lie distance. The embodiment is advantageous, because it is possible to design mappings such that there is a simple correspondence between Hamming or Lie distance and Euclidean distance. This enables selection of symbols which are neighboring in Euclidean distance without having to directly calculate Euclidean distance, which can be highly complex with large constellations in multiple dimensions. One embodiment of the invention determines the threshold as a minimal distance between the first codeword and any other codeword in the constellation. As a result, all codewords selected to the set of second codewords have the same distance, e.g., Hamming distance, to the first codeword. This embodiment is useful for decoding blocks of modulated symbols that provide sufficient number of second codewords with minimal distance to the first codeword. For example, for decoding a signal modulated with a 24-dimensional (24D) format over a 4D optical carrier, there can be 759 second codewords with minimum Hamming weight with respect to the first codeword.

Next, the method determines 430 a relative likelihood 435 of each second codeword being the transmitted symbol with respect to a likelihood of the first codeword being the transmitted symbol and determines 440 an approximation of a log-likelihood ratio (LLR) 445 of each data bit in the received symbol as a logarithm of a ratio of a sum of the relative likelihoods of at least some of the second codewords having the same value of the data bit to a sum of the relative likelihoods of at least some of the second codewords having different value of the data bit. Next, the method decodes 450 the received symbol using the LLR 445 of each data bit to produce the decoded symbol 455, wherein steps of method are performed using a processor of a decoder.

More specifically, some embodiments determine the LLR value L of a given bit $b_j$ within a received symbol x according to:

$$L(b_j = 0 \mid x) = \log\left(\frac{\sum_{x' \in P_j} S(x = x' \mid b_j = 0)}{\sum_{x' \in P_j} S(x = x' \mid b_j = 1)}\right),$$

wherein symbol likelihoods S are calculated for each possible symbol x' within a set of symbols $P_j$. Two subsets are formed from the set of symbols—a set for which $b_j=0$; and a set for which $b_j=1$.

In the presence of Gaussian noise over channel, the symbol likelihood S for a specific possible symbol x' is given by:

$$S(x = x') = \exp\left(\frac{-|x - x'|^2}{\sigma^2}\right),$$

wherein $\sigma^2$ is the noise variance.

In some situations, the exact calculation of soft-information can be prohibitively complex for high-dimensional modulation formats based on block codes. By utilizing the output of a hard decision decoder, some embodiments of the invention approximate the soft-information by considering only the nearest neighbors of the hard-decision codeword. Additionally, one embodiment considers only orthogonal dimensions in which the second codewords differ from the hard-decision first codeword. In this embodiment, the number of elements which comprise the soft-information is reduced.

The number of second codewords comprising the nearest neighbors for which the soft information is considered can be varied, with the complexity of the soft-output decoder becoming higher as this number is increased. In some embodiments, subsequent processing such as sorting or minimum searching is used to reduce the complexity of calculating the soft-information output. The calculation of LLR is then performed based on the most significant subset of symbol likelihoods, therefore reducing computational complexity.

Figure 6A:
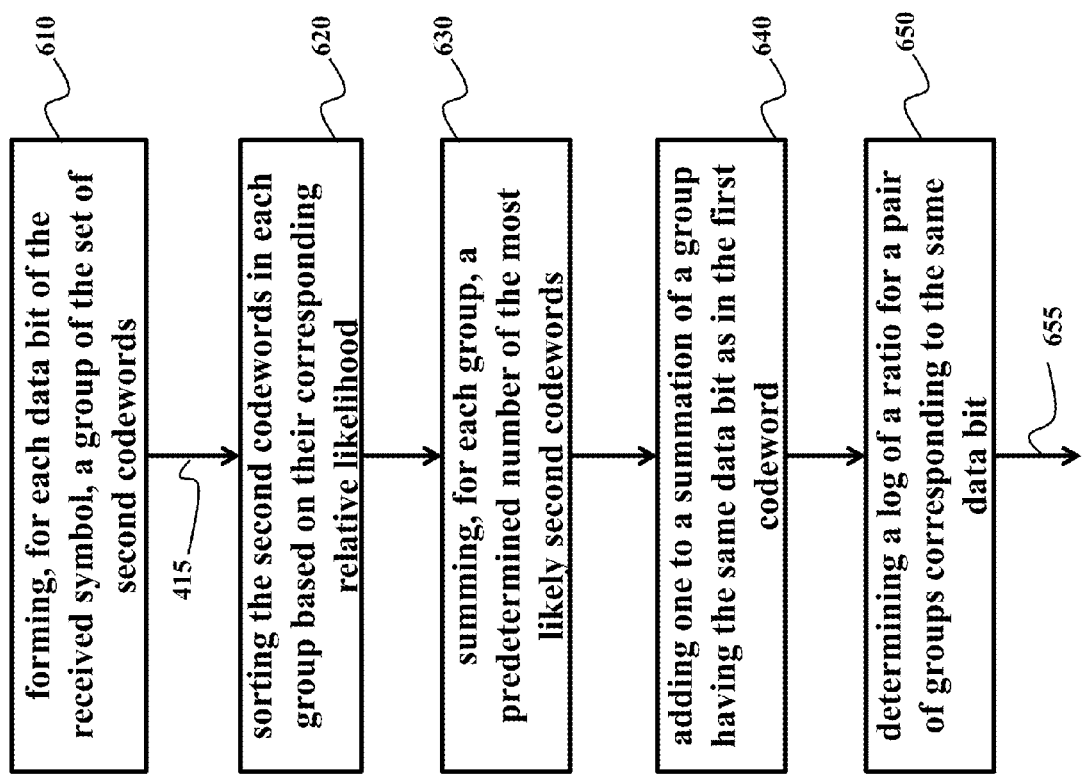
FIG. 6A is a block diagram of a method for determining an approximation of the log-likelihood ratio (LLR) for each data bit of the received symbol according to one embodiment of the invention.

FIG. 6A shows a block diagram of a method for determining an approximation of the LLR for each data bit of the received symbol according to one embodiment of the invention. The method forms, for each data bit of the received symbol, a group of the set of second codewords, such that there is one group for each data bit of the received symbol. The group formed such that a value of the data bits in each codeword in the group on a position of the corresponding data bit of the received symbol equals a value of the corresponding data bit of the received symbol.

Figure 6B:
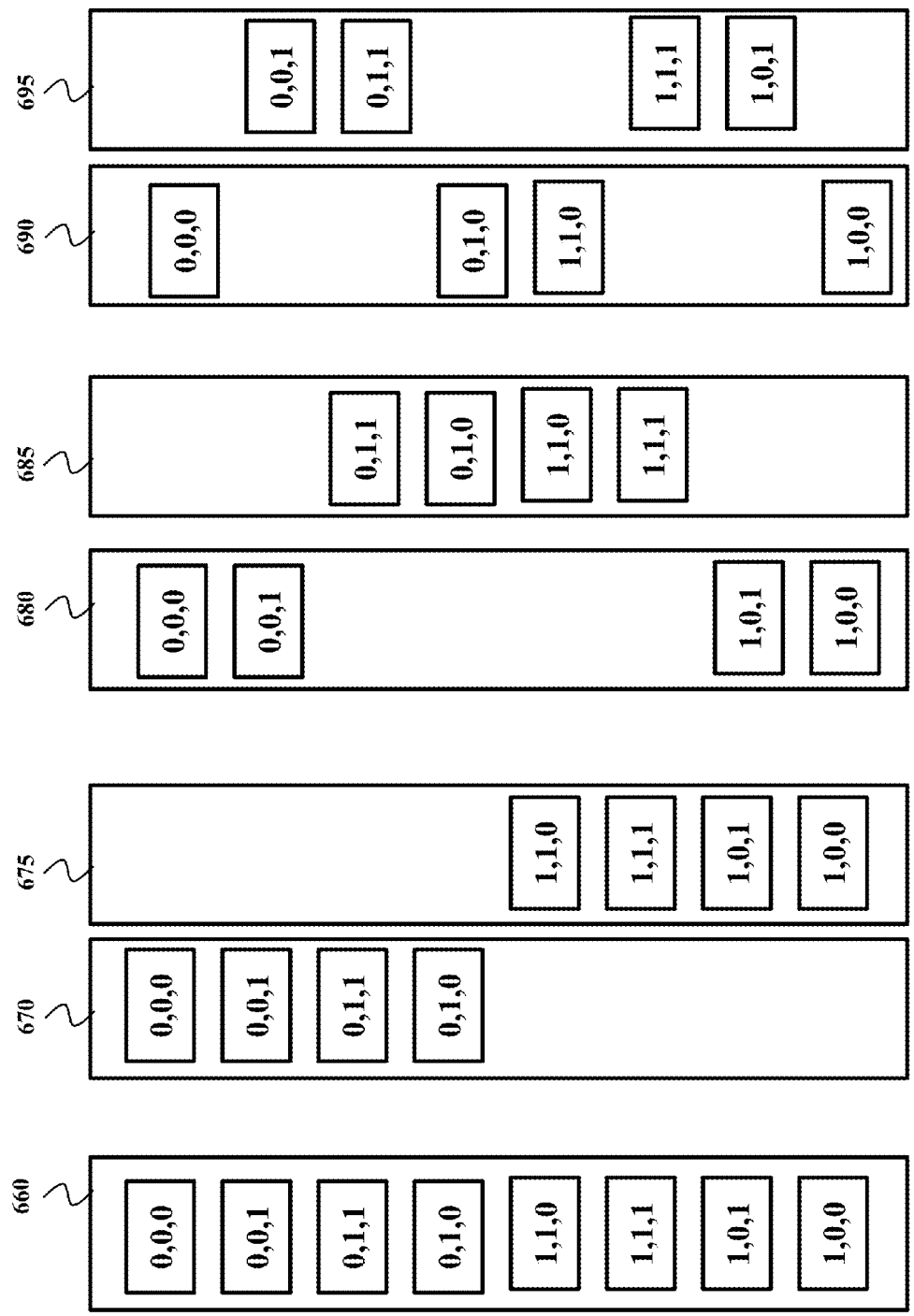
FIG. 6B is a schematic of possible groupings of symbols with three data bits constellation used by one embodiment of the invention.

FIG. 6B shows the possible groupings of symbols 660 with three data bits. Two groupings are made with the first bit being 0 (670) and 1 (675) respectively. Two further groupings are made with the second bit being 0 (680) and 1 (685) respectively. Two final groupings are made with the third bit being 0 (690) and 1 (695) respectively.

The method sorts 620 the second codewords in each group based on their corresponding relative likelihood. By sorting the possible symbols by likelihood, we are able to ignore symbols which have negligible likelihood from the bit LLR calculation. This is important, as most symbols have negligible likelihood.

The method sums 630, for each group, a predetermined number of the most likely second codewords and adds 640 one to a summation of a group having the same data bit as in the first codeword. The predetermined number is chosen in the design phase as a tradeoff between computational complexity and performance—choosing more symbols from the list will improve the accuracy of the LLR approximation, while increasing computational complexity.

The method determines 650 a logarithm of a ratio for a pair of groups corresponding to the same data bit (0 or 1) to produce 655 an approximation of the LLR for each data bit of the received symbol. The LLR is now approximated by a smaller number of subsets of symbol likelihoods, which give non-negligible likelihood values.

High-Dimensional Modulation for Coherent Optical Communications

Some embodiments of the invention determine the LLRs for optical communication using block-coded high-dimensional modulation formats, such as modulation with 24-dimensional (24D) signal constellations. In those embodiments the large number of signaling dimensions causes the number of possible symbols in the modulation format to become extremely large ($2^{12}$). In turn, this means that the number of symbol likelihoods that must be calculated is also extremely large ($2^{12}$). For each subset per bit in the LLR calculation, a large summation must also be calculated ($2^{11}$). Therefore, it is advantageous to reduce the complexity of this operation while maintaining accuracy at the given signal to noise ratio.

Figure 7:
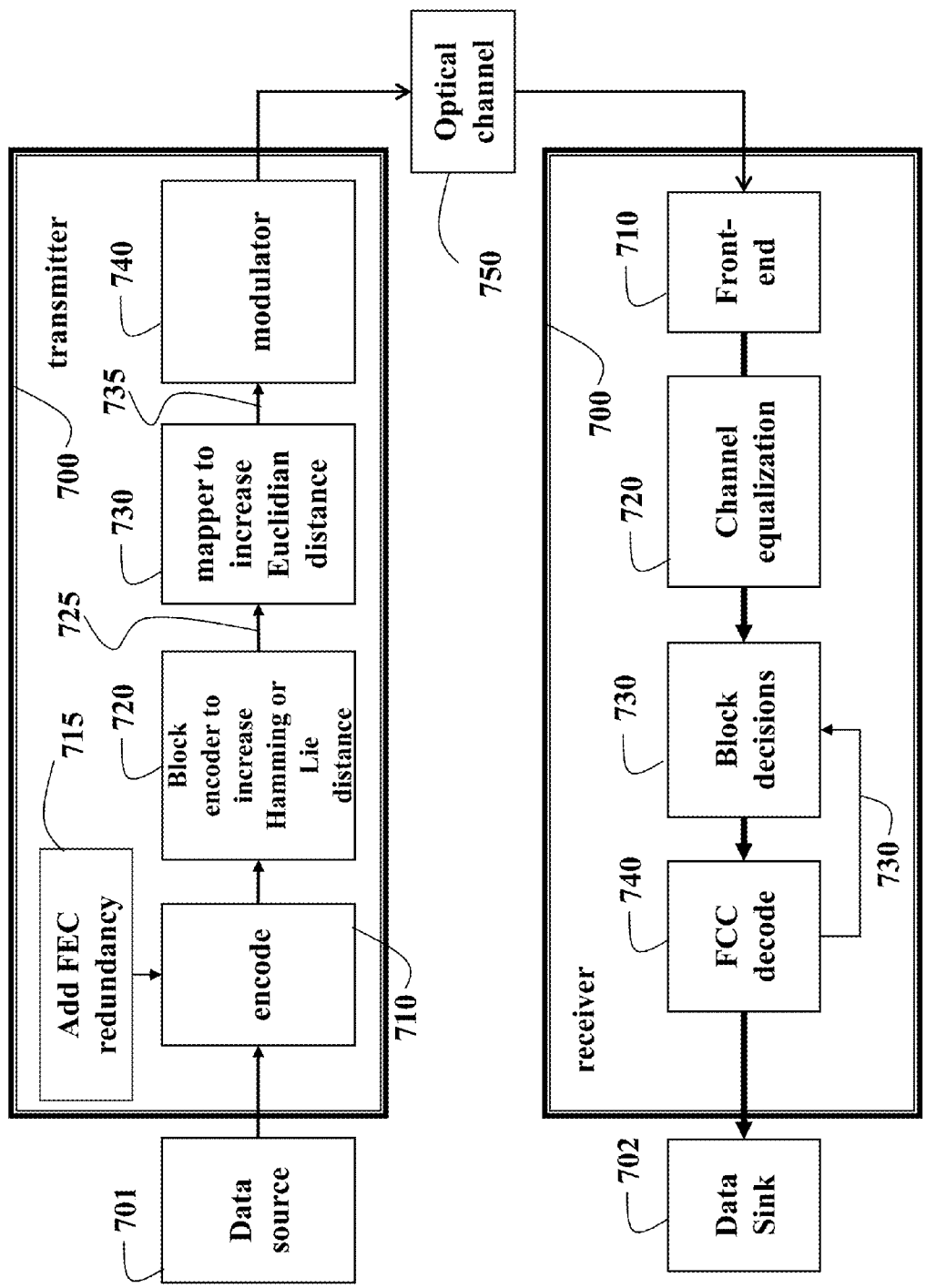
FIG. 7 is a block diagram of a system and/or a method for modulating an optical signal according to some embodiments of the invention.

FIG. 7 shows a block diagram of a system and/or a method for modulating an optical signal according to embodiments of the invention. The system includes a transmitter 700 connected to a receiver 700 by an optical fiber channel 750.

At the transmitter, data from a source 701 is outer encoded 710. The outer encoder adds FEC parity redundancy 715. Then, a block encoder is applied to an output of the outer encoder to produce encoded data 725. The block encoding is designed to increase the Hamming or Lie distances between constellation points that represent the data. A mapper 730 increases the Euclidian distances between constellation points to produce mapped data 735. Then, the code, in the form of the mapped data can be modulated 740 to a modulated signal that is transmitted through the optical channel 750. The transmission can use dense wavelength-division multiplexing (WDM), multi-mode spatial multiplexing, multi-core spatial multiplexing, sub-carrier signaling, single-carrier signaling, and combination thereof At the receiver, the steps of the transmitter are performed in a reverse order, wherein the modulated signal is demoduled, demappedg, block-decoding, and FEC decoded to recover the data. Specifically, front-end processing 710 and channel equalization 720 are applied to the received optical modulated signal. A block decision 730 is made to feed the soft-decision information to outer decoding 740 to recover the data for a data sink 702.

To transmit the optical signal modulated with a 24-dimensional (24D) format over a 4D optical carrier, we map a 24D orthogonal signal vector to a 4D optical carrier. To do so, we consider in-phase, quadrature-phase, polarization, and time as orthogonal dimensions. In some embodiments, 24D orthogonal signal vector is mapped to additional orthogonal dimensions such as spatial modes and frequencies.

Figure 8:
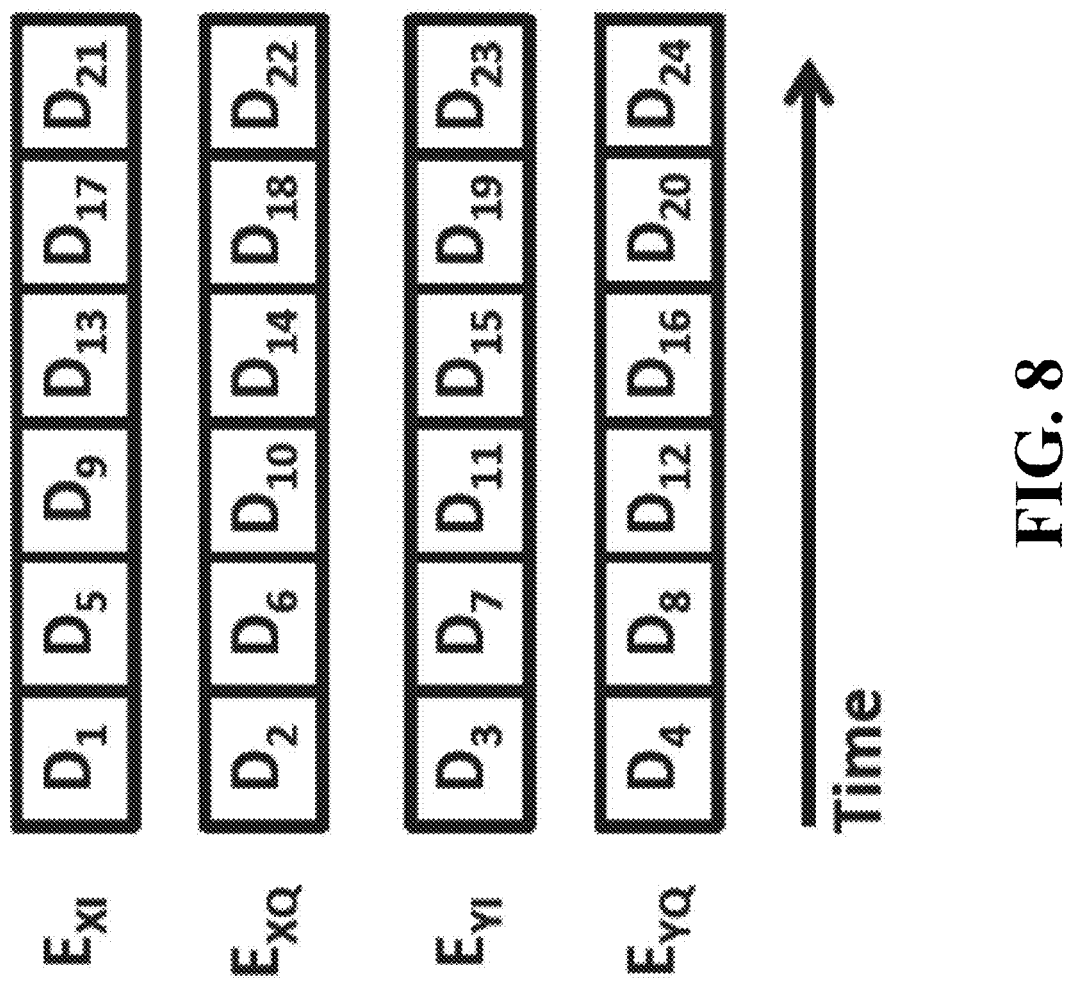
FIG. 8 is a schematic of an exemplar mapping of the basis vector to a carrier in a time domain according to some embodiments of the invention.

FIG. 8 shows an example mapping of 24D basis vector ($D_1, \ldots, D_{24}$) to the 4D carrier in a time domain, where $E_{XI}$ is the in-phase component of the optical carrier on the horizontal polarization, $E_{XQ}$ is the quadrature component of the optical carrier on the horizontal polarization, $E_{YI}$ is the in-phase component on the vertical polarization, and $E_{YQ}$ is the quadrature component on the vertical polarization.

In a hypercube constellation, i.e., a constellation where each dimension has a value ±1 that is independent of all other dimensions and every dimension is bit-labeled independently; the squared Euclidean distance between constellation points is linearly proportional to the Hamming distance. Therefore, we use a code designed to increase the Hamming distance and the Euclidean distance between constellation points. Taking advantage of this effect, we use the extended Golay code to determine a subset of the 24D hypercube. Then, the subset determines our constellation.

The extended Golay code encodes 12 bits of information into a 24-bit word with a minimum Hamming distance of 8. While this code has been used with an appropriate decoding matrix to correct for errors in wireless communication and memories, we take maximum-likelihood (ML) decisions in 24D to maintain soft information for an FEC decoder.

Although conventional ML decisions for a 12 bit word in 24D are usually highly complex, we use a low-complexity demodulation of such formats, e.g., a multiplier free procedure based on correlation metric calculation. It is also possible to use a lattice decoding or sphere decoding to reduce the complexity, which enables a practical implementation of the invention for short block sizes and real-time processing.

In Golay-coded 24D modulation, the $2^{12}$ points that correspond to valid extended Golay codewords are our constellation points, from a possible $2^{24}$ points on the 24D hypercube. The minimum squared Euclidean distance increases by a factor of 8 compared with the 24D hypercube, which has identical performance to that of DP-QPSK, while the mean energy per bit is doubled. Therefore, asymptotic power efficiency is increased by 6 dB compared with the 24D hypercube. The transmitter and receiver can be similar those used with DP-QPSK modulation because the constellation is a subset of the hypercube.

Figure 9:
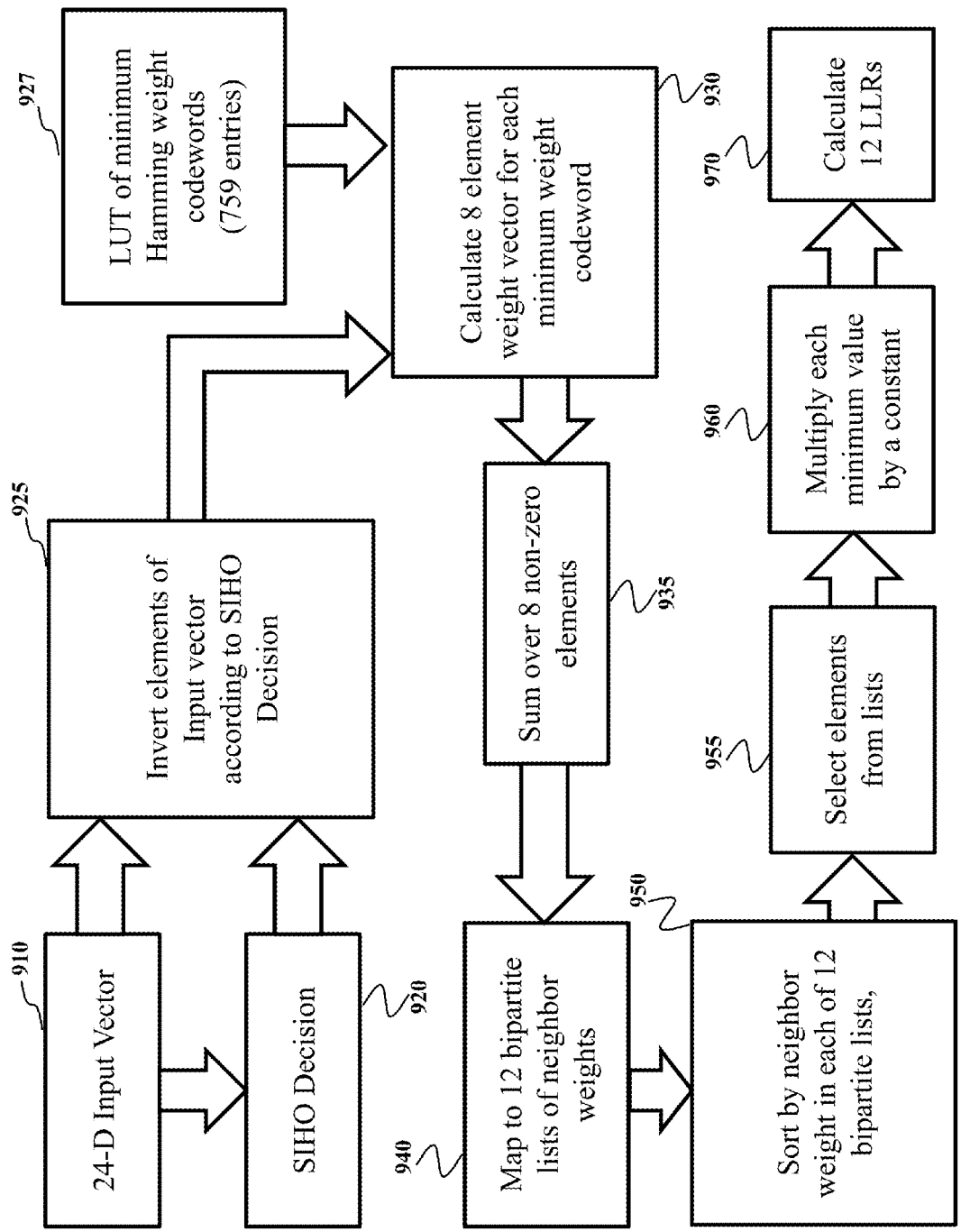
FIG. 9 is a block diagram of a method for approximating LLR calculation assuming according to one embodiment of the invention.

FIG. 9 shows a block diagram of a method for approximating LLR calculation assuming Golay-coded 24-D modulation according to one embodiment of the invention. A 24-D input vector 910 is used to calculate an initial soft-input hard-output decision 920. The bits $b_k$ from this decision are then used to invert 925 the elements $E_k$ of the input vector 910, to make a vector of new elements $M_k$ according to the rule $M_k = E_k*(-1)^{b_k}$. Following 925, a pre-determined list of minimum Hamming weight codewords 927 is used. The list of codewords 927 is denoted as L, which has 759 codewords of weight 8 in the case of the 24-D extended Golay code. The weight vector of each codeword in L is then calculated 930 by selecting the 8 elements $M_k$ from the manipulated vector, for which the corresponding bit $l_k$ in the codeword from L is 1. The weight vectors are then summed 935 over their 8 constituent elements, to create a single, scalar value for each of the 759 codewords. The list of codewords L is then formed 940 into 12 bipartite lists $L_{j1}$ and $L_{j0}$. These lists are defined by the codewords on list L for which bit position j is 1, and 0 respectively. $L_{j1}$ therefore has 506 elements, while $L_{j0}$ has 253 elements, therefore each pair of lists contains a weight corresponding to all L codewords. Each list is then sorted by value 950, and arranged from minimum to maximum. A fixed number of elements is then selected from each list, starting with the minimum 955. Each element is then multiplied by a constant 960, such that the log-symbol-likelihood, relative to the SIHO decision is produced. The log-sum-exponential function is then used on both lists, with an additional element of '1' being appended to the lists drawn from $L_{j0}$, to produce log-likelihoods $W_{j0}$ and $W_{j1}$. Each pair of log-likelihoods is then used in combination with the SIHO decisions to produce a log-likelihood-ratio 970, $R_j$, according to $R_j=(W_{j0}-W_{j1})*(-1)^{b_k}$.

Another embodiment uses a single parity-check code to increase the Hamming distance for 8D hypercube lattice modulations. The 7-bit data are encoded by a block encoder to generate 8-bit coded word. Each bit is modulated by BPSK per dimension, and then 8-dimensional BPSK mapped to the 4D optical carrier. The decoder procedure is same as the previous embodiment. The benefit of the 8D modulation is lower complex in both the encoder and the decoder.

Another embodiment uses near-perfect block codes, which offers the maximum possible Hamming distance over the hypercube lattice for a target data rate and dimensions. Near-perfect block codes include linear and nonlinear codes such as Nordstrom-Robinson code, or combinations of near-perfect codes. Using hypercube lattice, the increase of the Hamming distance can lead to the increase of Euclidean distance. Higher-dimensional lattice modulation can achieve better decoding for signals subject to linear and nonlinear noise.

An alternative embodiment maps the constellation to the 4D optical carrier using a densest hypersphere lattice. The block code is designed by greedy sphere cutting to sequentially select the closes points over high-dimensional lattice point.

LLR Approximation over Graph and Projection Shaping

In another embodiment, the block decision can be done using soft-information belief propagation over a graphical representation (factor graph) of the block codes. High-dimensional modulation based on block codes can be represented by a factor graph, in which parity-check equation is described by check nodes connecting to associated bit variable nodes. Using regular belief propagation based on sum-product algorithm over the factor graph, the LLR can be approximated. However, the factor graph is not well optimized for belief propagation because the parity-check matrix is usually not sparse and there are many cycles. The method of the invention uses the belief messages over one or two iterations over the factor graph as an initial estimate for the further processing to be more accurate. In one embodiment, the initial estimate of the LLRs including second nearest neighbors is modified by means of artificial neural network for nonlinear filtering. The method uses a large number of simulated received symbols for varying noise variance to learn the neural networks in order to produce accurate LLR output.

For example, the reinforcement learning based on stochastic back-propagation or linear discriminant analysis can be used to approximate LLR. The learning phase can be done offline. In addition, some edges in the neural networks are pruned so that the LLR calculation can be low complex. In another embodiment, another nonlinear filtering based on Volterra filter can be used to approximate the LLR. In yet another embodiment, the LLR approximation can be performed for nonbinary FEC coding, by treating multiple LLR values as a vectorized belief message.

The method can be used for bit-interleaved coded modulation (BICM) with iterative demodulation (ID), which employs iterative demodulation given soft-decision feedback from the FEC decoder. By feeding back the soft-decision information, the demodulator can produce more accurate LLRs. For this embodiment, the reinforcement learning is carried out offline by simulating noisy channels as well as various reliability levels of soft-decision information. The neural networks now use soft-decision information from the decoder in addition to the initial belief messages as input data. Given the true LLR values, the neural networks are stochastically learned by the back-propagation to approximate the LLR values over the network propagation.

In yet another embodiment, high-order and high-dimensional modulation formats are designed to maximize the mutual information of approximated LLR. The mutual information is calculated as follows:

$$\mathcal{I} = 1 - \mathbb{E}\log_2(1+\exp(-L))$$

where L is the output of approximated LLRs, and E denotes the expectation. The method of the invention uses a parametric projection of block-coded hyper-cube onto a subspace. For example, the projection based on Grassmannian exponential mapping is used to generate M-dimensional modulation formats from N-bit codeword. Any M-dimensional subspace of N-dimensional signals can be represented by M(N−M) parameters in theory. Such manifold can be expressed by matrix exponential function as follows:

$$I_{M \times N} \times \exp\left(\begin{bmatrix} 0_M & \Theta \\ -\Theta & 0_{N-M} \end{bmatrix}\right)$$

where $I_{M \times N}$ denotes the rectangular identity matrix of size M-by-N, $0_M$ denotes all-zero matrix of size M-by-M, and the theta matrix is a real-valued matrix of size M-by-(N−M). For example, 2-bit onto 1-dimensional modulation can be obtained by one parameter, and the Grassmannian projection of Gray-coded 2D square can be any arbitrary shaping of 4-PAM. The four signal points of the parameterized 4-PAM become −cos(theta)−sin(theta), −cos(theta)+sin(theta), cos(theta)−sin(theta), and cos(theta)+sin(theta). When theta is arctan(1/5), the 4-PAM signal can be regular 4-PAM (i.e., −3α, −α, α, and 3α) to generate 16-QAM, where two 4-PAM symbols are mapped onto in-phase and quadrature components independently. By adjusting the theta value as a function of noise variance, the method of invention can improve the mutual information by achieving shaping gain. The optimal theta can be obtained offline by evaluating the mutual information of the approximated LLR. The optimized theta is also different when nonbinary LLR approximation is used. The Grassmannian projection of block-coded hyper cube can be used to generate even higher-order modulations and also higher-dimensional modulations. In one embodiment, the projection matrix is Stiefel manifold.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding a symbol transmitted over a channel, wherein the symbol is encoded and modulated to include data bits and parity bits, comprising:
    receiving the symbol transmitted over a channel, wherein the received symbol includes the transmitted symbol modified with noise of the channel;
    selecting, from a constellation of codewords, a first codeword neighboring the received symbol and a set of second codewords neighboring the first codeword, wherein the selecting includes determining the first codeword using soft-in hard-out (SIHO) decoding of the received symbol and determining a plurality of codewords having a distance to the first codeword less or equal a threshold to form the set of second codewords;
    determining a relative likelihood of each second codeword being the transmitted symbol with respect to a likelihood of the first codeword being the transmitted symbol;
    determining an approximation of a log-likelihood ratio (LLR) of each data bit in the received symbol as a log of a ratio of a sum of the relative likelihoods of at least some of the second codewords having the same value of the data bit to a sum of the relative likelihoods of at least some of the second codewords having different value of the data bit; and
    decoding the received symbol using the LLR of each data bit in the received symbol, wherein steps of method are performed using a processor connected to a decoder.

2. The method of claim 1, wherein the received symbol includes the data bits modified with noise with known received values and unknown transmitted values.

3. The method of claim 1, wherein the distance is Hamming distance.

4. The method of claim 1, wherein the distance is Lie distance.

5. The method of claim 1, further comprising: determining the threshold as a minimal distance between the first codeword and any other codewords in a constellation of codewords.

6. The method of claim 1, further comprising:
forming, for each data bit of the received symbol, a group of the set of second codewords, such that there is one group for each data bit of the received symbol, wherein a value of the data bits in an each codeword in the group on a position of a corresponding data bit of the received symbol equals a value of the corresponding data bit of the received symbol;
sorting the set of second codewords in each group based on their corresponding relative likelihood;
summing, for each group, a predetermined number of the most likely second codewords;
adding one to a summation of a group having the same data bit as in the first codeword; and
determining a log of a ratio for a pair of groups corresponding to the same data bit to produce the approximation of the LLR for each data bit of the received symbol.

7. The method of claim 1, wherein the transmitted symbol is formed by
encoding a block code to increase Euclidean distance;
mapping in multi-dimensional hyper cubes; and
projecting onto multi-dimensional subspaces for shaping, wherein the projection matrix is a parametric manifold whose parameters are determined offline based on mutual information of the approximated LLRs.

8. The method of claim 1, wherein approximating the LLRs uses belief propagation over factor graph, and further refining the LLRs by nonlinear filters determined offline by learning algorithms.

9. The method of claim 1, wherein the LLRs are vectorized for nonbinary coding and decoding.

10. The method of claim 8, wherein the nonlinear filters are learned by received symbols and soft-decision feedback from the decoder to refine LLR values for iterative demodulation.

11. A receiver decoding a symbol transmitted over a channel, wherein the symbol is encoded and modulated to include data bits and parity bits, comprising:
a demodulator connected to an antenna to receive the symbol transmitted over a channel, wherein the received symbol includes the transmitted symbol modified with noise of the channel;
a memory to store a constellation of codewords; and
a decoder connected to a processor to select, from the constellation of codewords, a first codeword neighboring the received symbol and a set of second codewords neighboring the first codeword, to determine a relative likelihood of each second codeword being the transmitted symbol with respect to a likelihood of the first codeword being the transmitted symbol, to determine an approximation of a log-likelihood ratio (LLR) of each data bit in the received symbol as a log of a ratio of a sum of the relative likelihoods of at least some of the second codewords having the same value of the data bit to a sum of the relative likelihoods of at least some of the second codewords having different value of the data bit, and to decode the received symbol using the LLR of each data bit in the received symbol, wherein the decoder determines the first codeword using soft-in hard-out (SIHO) decoding of the received symbol and determines a plurality of codewords having a distance to the first codeword less or equal a threshold to form the set of second codewords.

12. A method for decoding a symbol transmitted over a channel, wherein the symbol is encoded and modulated to include data bits and parity bits, comprising:
receiving the symbol transmitted over a channel, wherein the received symbol includes the transmitted symbol modified with noise of the channel;
selecting, from a constellation of codewords, a first codeword neighboring the received symbol and a set of second codewords neighboring the first codeword;
determining a relative likelihood of each second codeword being the transmitted symbol with respect to a likelihood of the first codeword being the transmitted symbol;
determining an approximation of a log-likelihood ratio (LLR) of each data bit in the received symbol as a log of a ratio of a sum of the relative likelihoods of at least some of the second codewords having the same value of the data bit to a sum of the relative likelihoods of at least some of the second codewords having different value of the data bit, further comprising:
forming, for each data bit of the received symbol, a group of the set of second codewords, such that there is one group for each data bit of the received symbol, wherein a value of the data bits in an each codeword in the group on a position of a corresponding data bit of the received symbol equals a value of the corresponding data bit of the received symbol;
sorting the set of second codewords in each group based on their corresponding relative likelihood;
summing, for each group, a predetermined number of the most likely second codewords;
adding one to a summation of a group having the same data bit as in the first codeword; and
determining a log of a ratio for a pair of groups corresponding to the same data bit to produce the approximation of the LLR for each data bit of the received symbol; and
decoding the received symbol using the LLR of each data bit in the received symbol, wherein steps of method are performed using a processor connected to a decoder.

* * * * *